United States Patent [19]

Chan

[11] Patent Number: 5,198,952
[45] Date of Patent: Mar. 30, 1993

[54] ULTRA-COMPACT CASSETTE SYSTEM HAVING A REEL BRAKE MECHANISM

[76] Inventor: John Y. S. Chan, 24965 Huron St., Loma Linda, Calif. 92345

[21] Appl. No.: 906,413

[22] Filed: Jun. 30, 1992

Related U.S. Application Data

[62] Division of Ser. No. 724,172, Jul. 1, 1991.

[51] Int. Cl.$^5$ .............................................. G11B 23/02
[52] U.S. Cl. ..................................... 360/132; 242/199
[58] Field of Search .................. 360/132; 242/197–200

[56] References Cited

U.S. PATENT DOCUMENTS

| | | |
|---|---|---|
| 3,610,552 | 10/1971 | Shirakura ........................ 360/94 X |
| 3,964,099 | 4/1976 | Sato . |
| 4,408,733 | 10/1983 | Ooishi ................................. 242/199 |
| 4,453,683 | 3/1984 | Reimer et al. . |
| 4,477,850 | 11/1984 | Ogata et al. . |
| 4,536,810 | 1/1985 | Umeda . |
| 4,554,603 | 6/1985 | Tsuchiya . |
| 4,558,384 | 9/1985 | Umeda . |
| 4,567,536 | 5/1986 | Tsuchiya . |

*Primary Examiner*—A. J. Heinz
*Attorney, Agent, or Firm*—Shoemaker and Mattare Ltd.

[57] ABSTRACT

An ultra-compact tape cassette system includes an ultra-compact cassette and an adaptor, simulating a standard compact cassette, which allows the cassette to be played in a recorder designed for a standard compact cassette. When the cassette is inserted into the adapter, internal reel brakes are automatically de-activated, and the front door of the cassette is opened, to expose the tape for playing. The adapter further comprises devices which simulate recordable tabs and reflect the recordable status of the ultra-compact cassette.

4 Claims, 6 Drawing Sheets

FIG. 2a
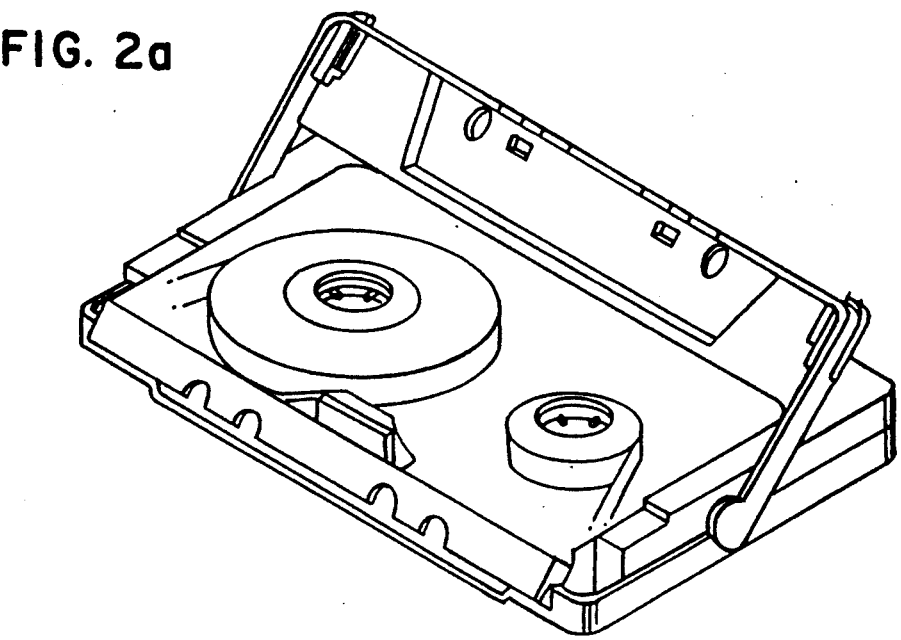
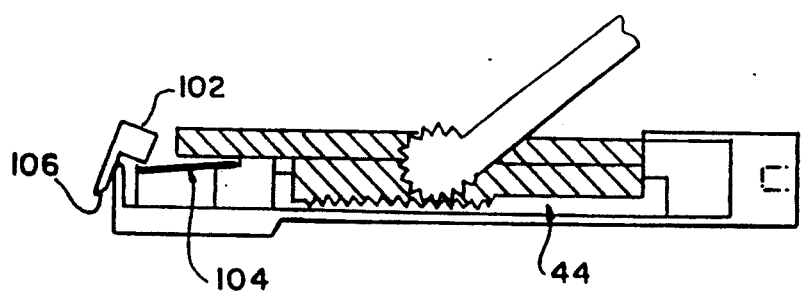
FIG. 2b
FIG. 3a
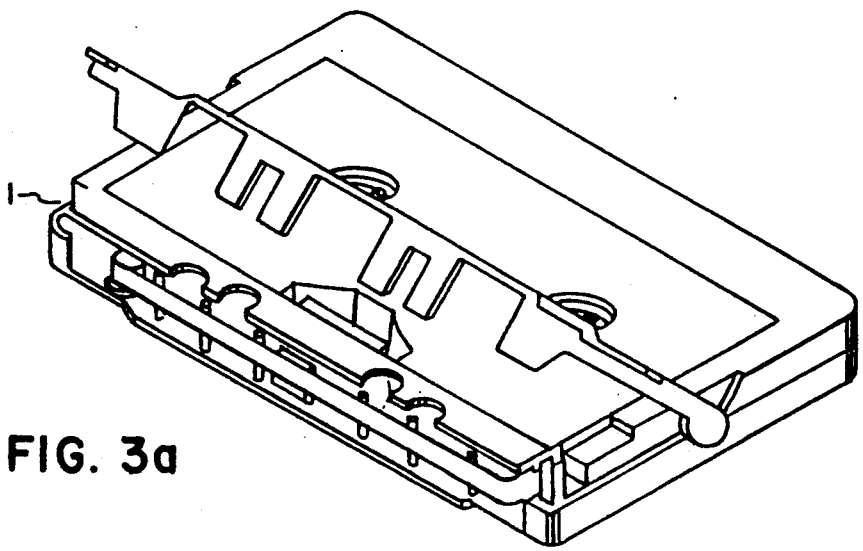

FIG. 7a
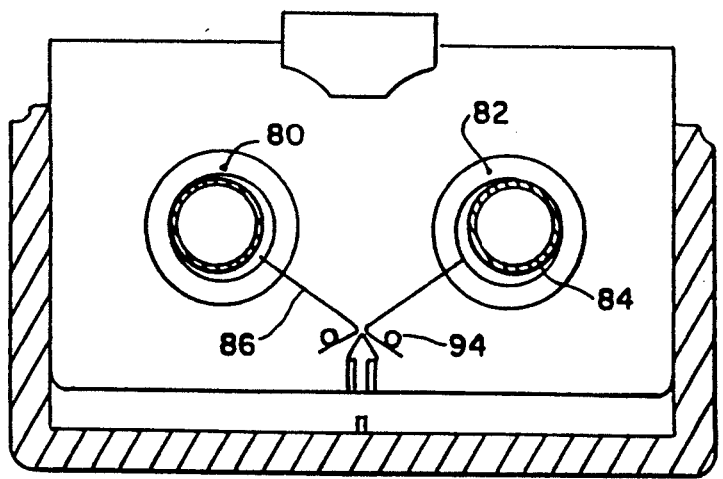
FIG. 7b
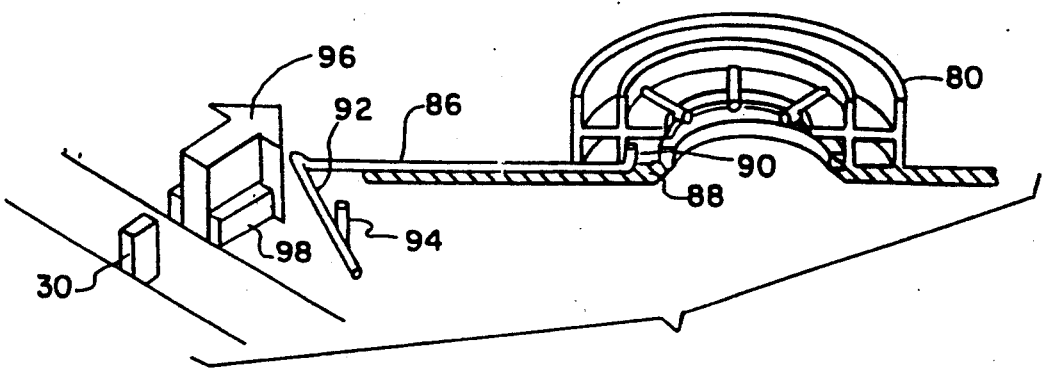
FIG. 7c
FIG. 8a
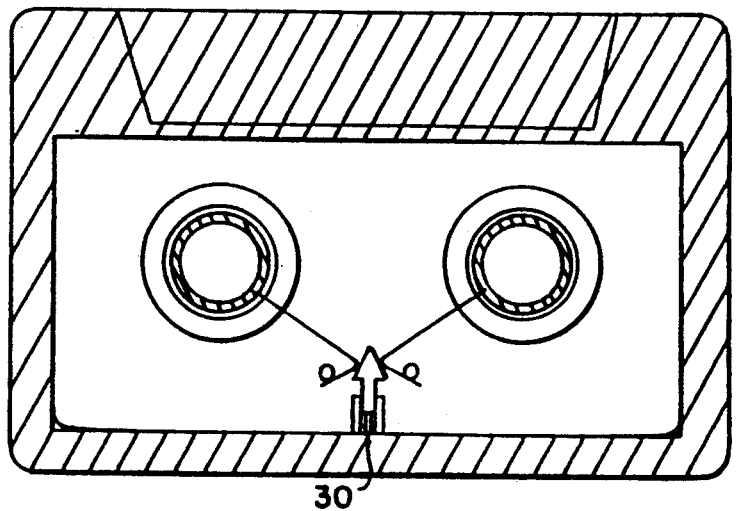
FIG. 8b
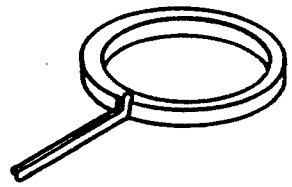

ULTRA-COMPACT CASSETTE SYSTEM HAVING A REEL BRAKE MECHANISM

This is a division, of application Ser. No. 07/724,172, filed Jul. 1, 1991.

BACKGROUND OF THE INVENTION

This invention relates to magnetic tape devices generally, and more particularly to a cassette system for magnetic tape, for example, audio tape.

Audio cassettes have already undergone one level of size reduction; the most popular size of cassette today is referred to as "compact". Smaller cassettes are easier to store, handle and transport, and require less material for manufacture. They also enable manufacturers to reduce the size of tape players and recorders. Accordingly, further size reduction is desirable. However, in order for smaller cassettes to be accepted, it is necessary to enable them to be played in existing equipment.

SUMMARY OF THE INVENTION

It is an object of this invention to enable one to play or record ultra-compact cassettes in a conventional compact cassette recorder.

Another object of the invention is to prevent slack from developing in the tape of an ultra-compact cassette when the cassette is in storage or transit.

A further object is to convey to a conventional player or recorder the recordable status of the ultra-compact cassette (that is, whether one or more tabs on the cassette have been broken to prevent recording over the tape).

These and other objects are met by an adapter for adapting an ultra-compact cassette to a conventional compact cassette recorder, comprising a housing having a floor bounded by lateral walls and a rear wall, and a hinged door opposite the rear wall, the walls and the door defining a cavity for receiving the ultra-compact cassette, and a cover for partially closing the cavity from above, the cover being hinged to the side walls by respective pivots, a pair of pinions, one fixed to each pivot so that the pinions turn as the cover is moved between its open and closed positions, a pair of rails, movably mounted within the housing along each of the side walls, each of the rails comprising means for engaging the ultra-compact cassette, and each rail having a rack in mesh with a respective one of the pinions, whereby the racks move in unison lengthwise as the cover is moved, so that when the cover is closed, the ultra-compact cassette is driven toward the rear of the housing, and further comprising means for engaging the magnetic tape of the ultra-compact cassette and for guiding it along a path adjacent to the door of the adapter.

Another aspect of the invention is an ultra-compact magnetic tape cassette comprising a housing having top and bottom panels, a pair of tape reels within the housing, on either side of a center plane bisecting the housing, a pair of circular flanges formed in at least one panel of the housing, for supporting and centering the respective tape reels, a pair of grooves extending along the inner surface of the panel, each groove having a portion formed in the flange, and extending therefrom in a substantially straight line from the flange toward the center plane, a pair of elongate members, each extending along and within a respective one of the grooves, and having an upturned end seatable in the portion of the groove formed in the flange, means for biasing each elongated member away from its seated position, whereby the upturned end engages a surface of its respective reel, to prevent movement of the same, and means within the housing for displacing the elongated members toward their seated position, to release the reels.

BRIEF DESCRIPTION OF THE DRAWINGS

In the accompanying drawings,

FIG. 2a is a view corresponding to FIG. 1a, showing the ultra-compact cassette inserted into the adapter;

FIG. 2b is a sectional side elevation thereof;

FIG. 3a is a perspective view showing the cover of the adapter being closed;

FIG. 7a is a simplified sectional top view of the ultra-compact cassette being installed in the adapted, showing a braking mechanism for the tape reels;

FIG. 7b is a detailed perspective sectional view of a portion thereof;

FIG. 7c is an enlarged sectional diagram of a portion of a device for releasing the reel brake;

FIGS. 8a, 8b and 8c are views corresponding to FIGS. 7a, 7b and 7c, showing the reel brake released.

DESCRIPTION OF THE PREFERRED EMBODIMENT

Figure 1A:
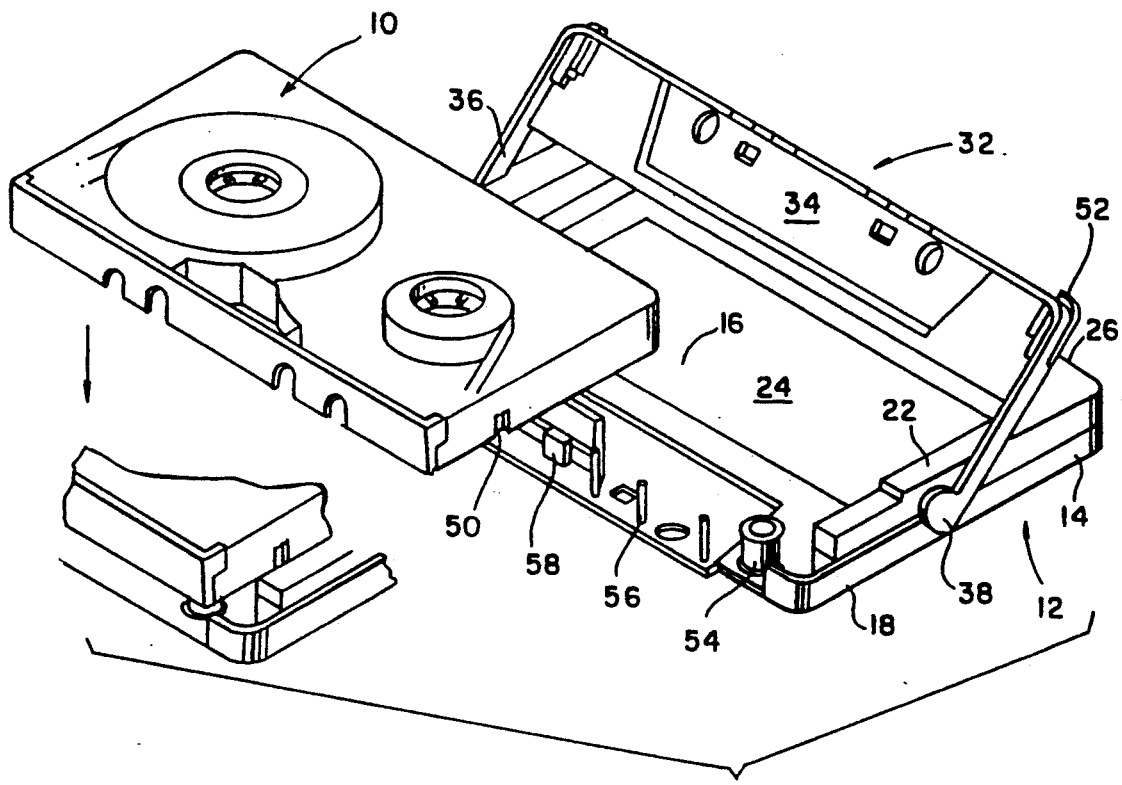
FIG. 1a is an exploded perspective view, looking downward toward the front of an ultra-compact cassette, positioned for insertion into an adapter constructed according to the invention.

As shown in FIG. 1a, the invention comprises two major components: an ultra-compact cassette 10 and an adapter 12 which simulates a conventional compact cassette. The adapter includes a housing 14, which may be injection molded from a plastic material, the housing having a floor 16 bounded by lateral sides 18 with upper flanges 22. The distance between the flanges is just slightly greater than the width of the ultra-compact cassette, which can therefore be inserted easily into the cavity 24 defined between the sides of the adapter. The rear 26 of the adapter is closed and turned over to form a lip 28, defining a pocket or recess into which the ultra-compact cassette can slide once it has been inserted into the adapter. There is a central projection 30 at the rear of the pocket, which initiates release of reel brakes described below.

Figure 9:
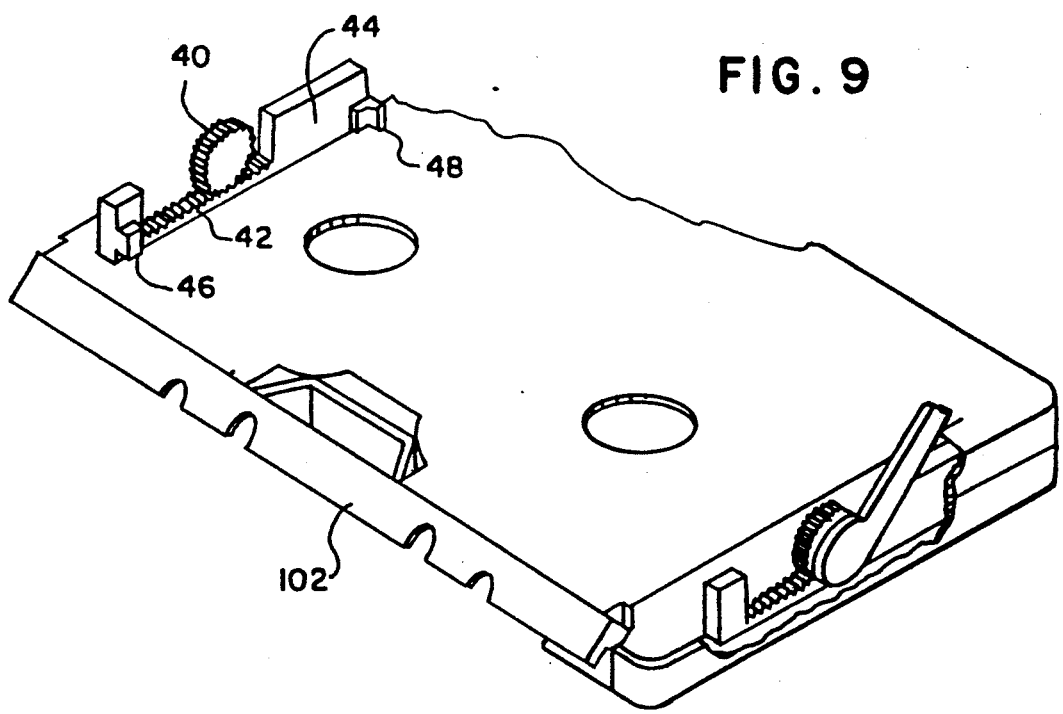
FIG. 9 is a perspective view of a portion of the adapter casing, showing rails inside the housing in detail.

To retain the ultra-compact cassette within the adapter once it has been inserted, there is a cover 32 comprising a panel 34 with arms 36 extending from either side thereof. The arms terminate at pivots 38, and a pinion 40 is fixed on each pivot, so that the pinions turn as the cover is moved. Each pinion is permanently in mesh with a rack 42 formed on a slidable rail 44, retained within either side of the adapter, as seen in FIG. 9. Each rail has two upwardly and inwardly turned tabs 46, 48, one at either end. The rear tab 48 engages behind the rear corner of the ultra-compact cassette when it is inserted, initially preventing the ultra-compact cassette from sliding back into the pocket. The ultra-compact cassette has a slot 50 on either side corresponding to the initial position of the forward tab 46, so that these tabs enter the slots when the cassette is placed into the adapter. When the cover is closed, the arms rotate the pinions 40 through a partial turn, driving the rails 44 toward the rear end of the adapter, into the pocket.

Figure 5A:
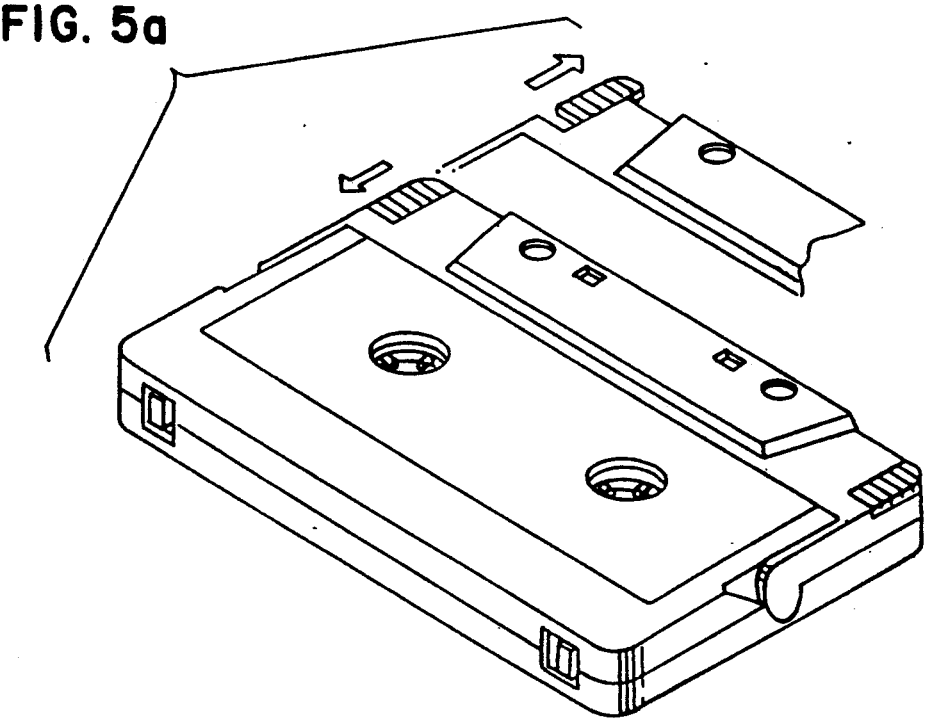
FIG. 5a is a perspective view, looking downward from the rear of the device, showing a pair of latches for securing the cover.
Figure 5B:
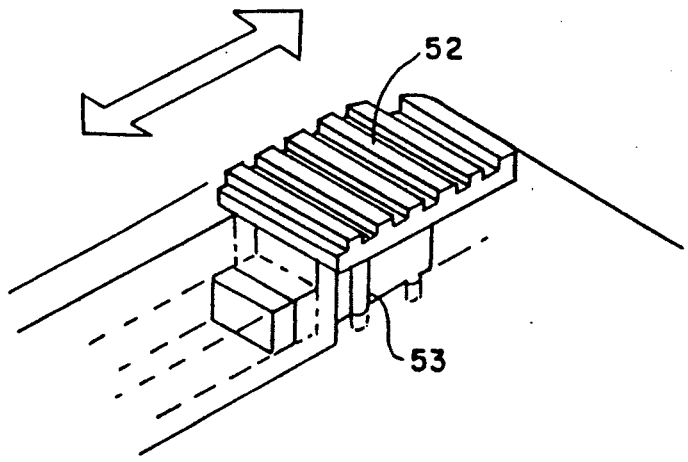
FIG. 5b is an enlarged view of one of the latches.

Referring to FIGS. 5a and 5b, the cover includes a pair of sliding latches 52, one at either corner, which can be pushed rearwardly to lock the cover in the closed position. Each latch has a pair of detents 53, defining its open and closed positions, to prevent unintended movement.

Figure 1B:
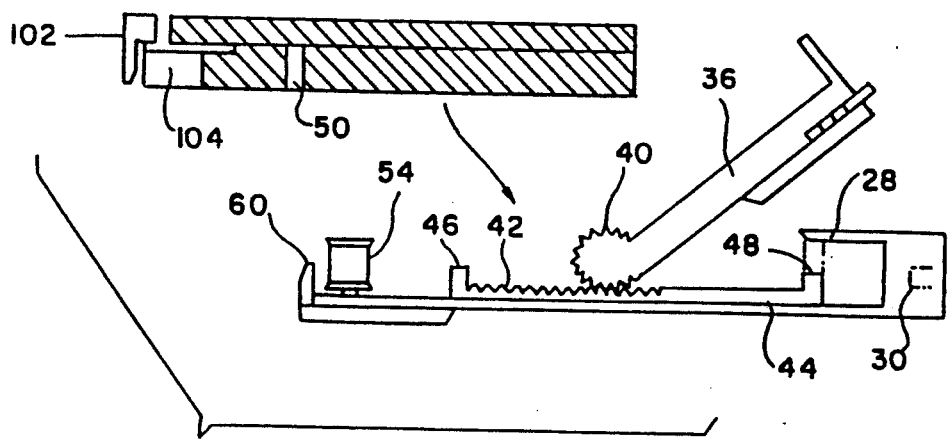
FIG. 1b is a sectional side view thereof.

Mounted along the forward edge of the floor of the adapter are: a pair of guide rollers 54 (FIG. 1a), one near either corner of the adapter; a number of tape guide pins 56; and a spring pad 58 between the centermost pins, for biasing the tape toward a play and/or record head in a tape recorder (not shown). The rollers and pins guide the magnetic tape along a path parallel to and behind the closed position of the door described below. A beveled opener 60 (FIG. 1b) extends upward from the forward edge of the floor.

Figures 6A, 6B:
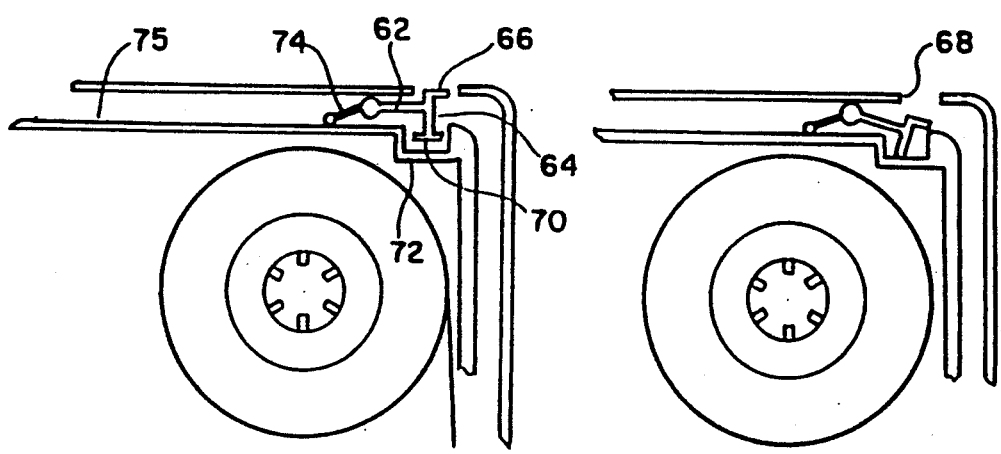
FIG. 6a is a sectional view from above the device, showing a lever which simulates a recordable tab, shown in a position which permits recording over the tape.
FIG. 6b is a view like FIG. 6a, showing the lever in a position preventing recording.

Referring now to FIGS. 6a and 6b, the adapter contains, near either rear corner, a lever 62, mounted on a vertical pivot axis just inside the rear face of the housing. The lever extends laterally outward from the pivot axis, terminating at an probe 64 which has an offset flange 66 situated in alignment with a rectangular hole 68 in the rear face of the housing. The probe 64 senses the presence or absence of a recordable tab (70) on the UCC. An integral leaf spring 74 bears against the inner rear wall 75 of the housing, biasing the lever towards a position indicating the tape cannot be recorded over, shown in FIG. 6b. However, this position can only be maintained when the recordable tab 70 has been removed from the ultra-compact cassette; otherwise, the lever is forced to the FIG. 6a position (recordable). Thus, the offset flange simulates a recordable tab on the adapter, and the machine into which the adapter is placed senses the "presence" or "absence" of the offset tab, and permits or prevents recording, respectively.

Figure 8C:
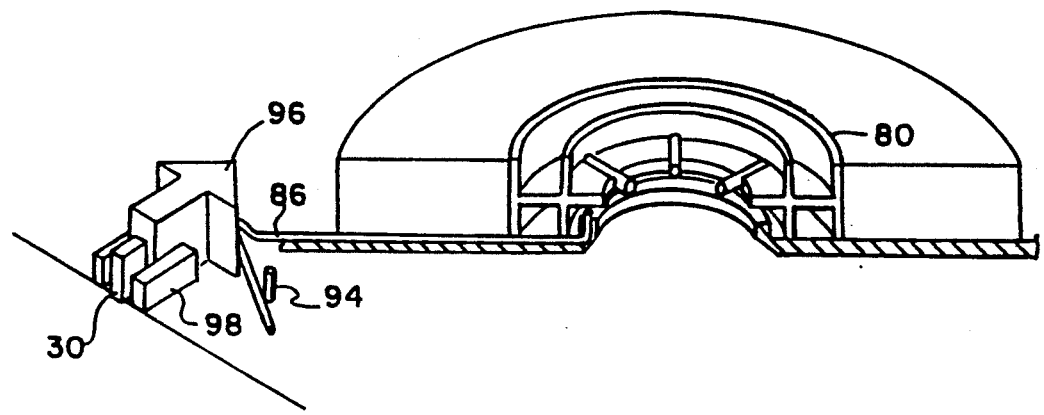

As shown in FIGS. 7 and 8, the ultra-compact cassette 10 itself comprises a plastic housing 76 having top and bottom panels 78 with a pair of tape reels 80,82 sandwiched therebetween. Each of the reels has an inside diameter, or bore, which is loosely centered over opposed circular flanges 84 extending inwardly from the top and bottom panels, serving as hubs upon which the reels rotate.

To prevent the reels from rotating when the tape is not in use, a pair of stiff wires 86 are situated in respective grooves 88, each at least as deep as the wire diameter, in the upper surface of the bottom panel of the ultra-compact cassette. The grooves extend to, and into, the respective circular flanges 84. Each groove is partially covered to prevent the wire from popping out of position. The tip 90 of each wire, the end near the flange, is bent upwardly; the other end is bent laterally at an acute angle to form an elbow 92 which bears against a pin on the lower ultra-compact cassette panel. The wires may move lengthwise along their grooves, between a retracted position in which the tips engage the inner diameter of their respective reels, to prevent rotation, and an extended position in which the tip rests in the groove within the flange, out of contact with the reel.

To drive the wires from the retracted position toward the extended position, there is an actuator 96 shaped like an arrowhead, mounted between stationary guides 98 formed on the bottom panel of the ultra-compact cassette. The oblique surfaces 100 on the arrow engage with the elbows of the wires. The normal position of the actuator is rearward; however, when the ultra-compact cassette is inserted into the adapter, and the cover closed, the projection 30 mentioned previously pushes the actuator forward, driving the wires along their grooves toward the flanges, and releasing the reels. As soon as the ultra-compact cassette is removed from the adapter, however, the wire automatically retract to prevent movement of the reels.

Figure 3B:
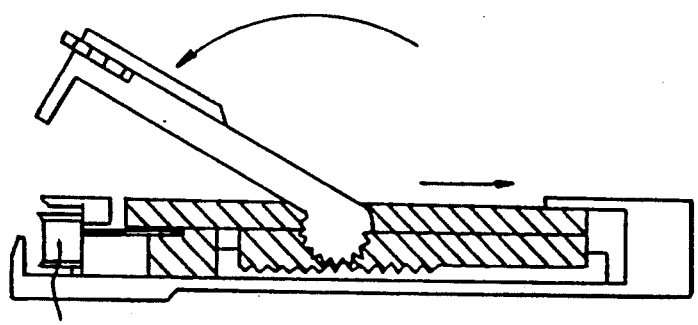
FIG. 3b is a sectional side elevation thereof.
Figure 4A:
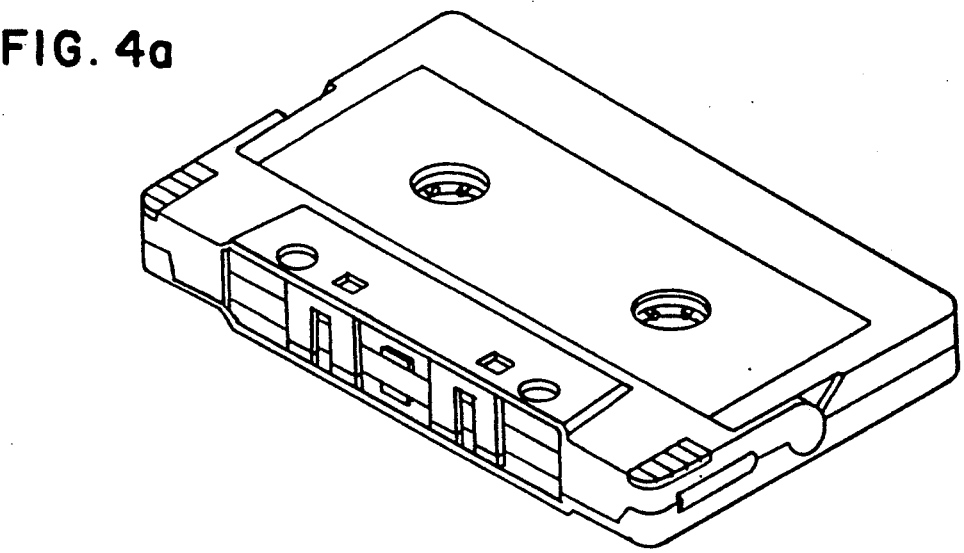
FIG. 4a is a perspective view showing the adapter fully closed.
Figure 4B:
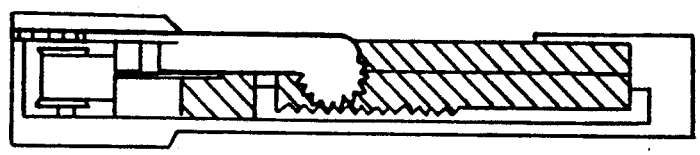
FIG. 4b is a sectional side elevation thereof.

The front of the ultra-compact cassette is normally closed by a door 102 (FIG. 2b), pivoted at its ends along an axis near the top of the ultra-compact cassette. A leaf spring 104 biases the door to its fully open or closed position. The door has an inwardly beveled lower edge 106, so that when the ultra-compact cassette is inserted into the adapter (FIGS. 2a and 2b), the opener 60 on the floor of the adapter can enter behind the door and open it slightly. At this point, the tape within the ultra-compact cassette is forward of the guide rollers and pins on the adapter. Then, when the adapter cover is closed (FIGS. 3 and 4), the door is fully opened by the opener, and the tape is drawn against the rollers, passing in front of the guide pins and spring pad. The adapter, simulating a standard compact cassette, is now ready to be used in a conventional recorder.

To remove the ultra-compact cassette from the adapter, the installation procedure is reversed. The latches shown in FIG. 5 can be slid forward to release the cover. As the cover is opened, the rack and pinion arrangement forces the ultra-compact cassette forward, so that it can be removed from the adapter. The tape is then wound taut by the rotating action of a finger on the reel and the front door is flipped manually to the closed position before the ultra-compact cassette is removed. As soon as the ultra-compact cassette has been moved forward, its reel brakes are automatically activated, preventing the tape from accidentally unreeling during storage or transport.

The preferred reel braking mechanisms described above are wires; however, rods or other elongate members could be used as well. Therefore, a generic term is used in the claims that follow.

Inasmuch as the invention is subject to modifications and variations, it is intended that the foregoing description and the accompanying drawings shall be interpreted as illustrative of only one form of the invention, whose scope is to be measured by the following claims.

I claim:

1. An ultra-compact magnetic tape cassette comprising
   a housing having top and bottom panels,
   a pair of tape reels within the housing, on either side of a center plane bisecting the housing, a pair of circular flanges formed in at least one panel of the housing, for supporting and centering the respective tape reels, a pair of grooves extending along the inner surface of said panel, each groove having a portion formed in said flange, and extending therefrom in a substantially straight line from said flange toward said center plane, a pair of elongate members, each extending along and within a respective one of said grooves, and having an upturned end seatable in the portion of the groove formed in the flange, means for biasing each elongated member away from its seated position, whereby the upturned end engages a surface of its respective reel, to prevent movement of the same, and means within said housing for displacing said elongated members toward their seated position, to release said reels.

2. The invention of claim 1 wherein the displacing means comprises a member movably mounted within the housing, said member having a pair of contact surfaces, each abutting a portion of a respective one of said elongated members, for pushing the member toward said seated position.

3. The invention of claim 2 wherein said movably member is mounted for movement substantially within said center plane, and said housing has an opening through which said member may be pushed to release said brakes.

4. The invention of claim 3 wherein each of said elongated members has a portion which engages an abutment within said housing, and said portion acts as said biasing means.

* * * * *